United States Patent [19]

Keil

[11] 4,231,872
[45] Nov. 4, 1980

[54] DEVICE FOR COMPLETE DESALINATION OF WATER

[76] Inventor: Wolfgang Keil, Kopernikusstr. 9, D-4044 Kaarst 1, Fed. Rep. of Germany

[21] Appl. No.: 964,073

[22] Filed: Nov. 27, 1978

[30] Foreign Application Priority Data

Nov. 25, 1977 [DE] Fed. Rep. of Germany ..... 27525811

[51] Int. Cl.$^3$ ...................... B01D 27/00; B01D 35/02; B01J 47/04
[52] U.S. Cl. ...................................... 210/93; 210/232; 210/282; 210/289
[58] Field of Search ................. 210/232, 263, 282, 283, 210/289, 291, 85, 93, 206, 510, 446

[56] References Cited

U.S. PATENT DOCUMENTS

| | | | |
|---|---|---|---|
| 2,869,724 | 1/1959 | McDevitt | 210/282 X R |
| 2,987,187 | 6/1961 | Comroe | 210/244 |
| 3,771,660 | 11/1973 | Smith . | |
| 4,021,354 | 5/1977 | Lyon | 210/510 X R |

FOREIGN PATENT DOCUMENTS

| | | |
|---|---|---|
| 699122 | 5/1967 | Belgium . |
| 2020929 | 1/1972 | Fed. Rep. of Germany . |
| 2125007 | 11/1972 | Fed. Rep. of Germany . |
| 1097951 | 7/1955 | France . |
| 1378835 | 10/1964 | France . |
| 7029950 | 4/1972 | France . |
| 2177450 | 11/1973 | France . |
| 572868 | 8/1974 | Switzerland . |
| 553698 | 9/1974 | Switzerland . |
| 797103 | 6/1938 | United Kingdom . |

*Primary Examiner*—Ferris H. Lander
*Attorney, Agent, or Firm*—Shlesinger, Arkwright, Garvey & Dinsmore

[57] ABSTRACT

An apparatus for the desalination of water using a mixed cation-anion exchange resin bed and comprising a cylindrical, pressure resistant tank, a disposable cartridge containing the resin and positioned in the tank and seals at the sides of the cartridge for preventing leakage around the bed; the cartridge is preferably made from a lightweight, inexpensive material such as a polyolefin plastic, i.e., polyethylene.

11 Claims, 1 Drawing Figure

U.S. Patent
Nov. 4, 1980
4,231,872
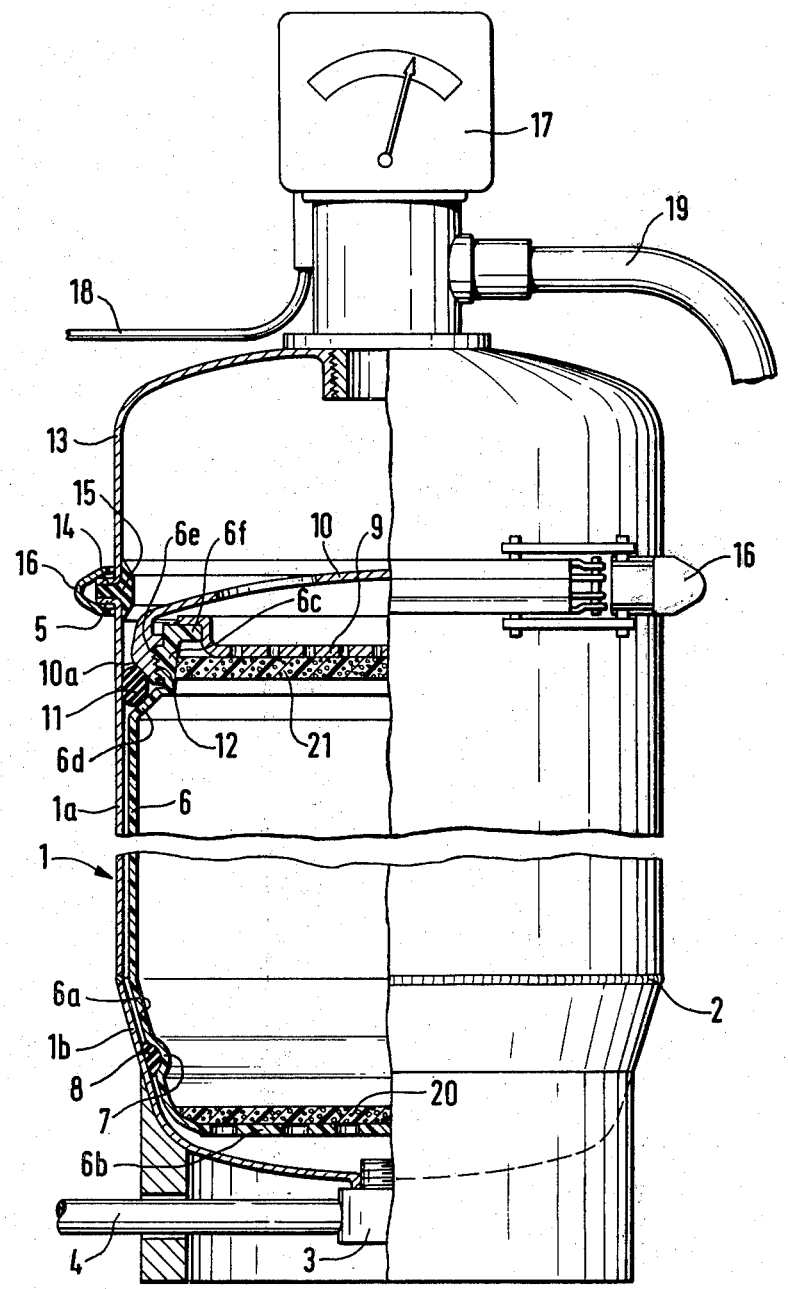

DEVICE FOR COMPLETE DESALINATION OF WATER

The invention relates to a device for complete desalination of water with a cylindrical, pressure-resistant tank, wherein a mixed bed of cation-and anion-exchanging resins is found between its water inlet and water discharge connections.

Devices of this type are known from German Pat. No. 1,984,990. They are used particularly for laboratories, pharmacies, hospitals and such operations, in which the desalted water is used in small quantities and at different time intervals, and there they increasingly replace the distillation devices which have until now been used for the complete desalination of water. The devices consist of a bottle-like tank with connections for water inlet and discharge, wherein a mixed bed of cation-and anion-exchanging materials is found between these two connections, and the water is passed through the bed. In the vicinity of the discharge connection, an electrically operated conductometer, is usually attached to the device which enables control of whether the mixed bed is still operable.

With exhaustion of the exchange material, the device is replaced by another device with regenerated exchanger material and fed to a regeneration station, where the exchange material undergoes a regeneration process. Then the device can be used again, for example by exchange for a device with a mixed bed which has meanwhile become exhausted.

The regeneration of the exhausted exchange materials is relatively complicated and bothersome, since the tank must be first drained, then packed and transferred to the regeneration station. In the regeneration process itself, salts and also the excess chemicals which are present for the process, such as hydrochloric or muriatic acid and soda liquor, accumulate as waste materials. Subsequently the device must be returned to the user. Considerable transportation costs occur thereby on account of the size and the weight of the device.

A device for water treatment, particularly water softening, is known in U.S. Pat. No. 2,087,157 and U.S. Pat. No. 2,278,488, in which bag-like flexible material units, for example of cloth, are filled with granulated minerals and inserted in a tank. The diameter of this unit is somewhat larger than the diameter of the tank, so that the inserted units, under the pressure of the mineral filling, are engaged tightly and watertight on the inside wall of the tank. In U.S. Pat. No. 2,278,488, the tank is configured with slightly conical taper upward, so that the inserted units can be removed from the tank with great difficulty after exhaustion of the minerals. The minerals are then fed into a regeneration station and after regeneration are returned to the tank.

The advantages which are attained by use of inserts are, in general, only small. The transport to the regeneration station and back, and the regeneration process itself are costly and remain unchanged. Also, with bag-like insert units, the danger of damage during transport necessitate additional precautionary measures, and the production of conical tanks leads to higher manufacturing cost. Finally, with conical configuration of the tank, a leakage current can still occur between tank and insert, where the water is not subjected to the treatment by minerals. This can occur for example as a result of an insignificant fold or creasing of the sack-like insert, which can occur easily during the operation by contraction or shrinkage of the minerals, or by nonuniform compression pressure, produced by a varying distribution of the minerals. Also, the insert can slide under the pressure of the incoming water, in the case of the aforementioned shrinkage.

The object of the invention is to provide for the substitution (replacement) of the exhausted exchange resins in a more simple and less costly manner, while avoiding the aforementioned difficulties.

In the invention, the mixed bed is made up of exchanger resins in cartridges which are water-permeable on the front and configured as dispensable containers, and the cartridge is affixed removably in the tank and is sealed against leakage flow along the sides. Thus it is already clear from consideration of the invention that it is less costly and simpler to no longer subject the exhausted exchange resins to a regeneration process but after exhaustion either to destroy them or to use them as fertilizer. The exhausted exchanger resins are neutral and contain composition materials for plants. The cost of dispensable cartridges can thereby be held so low that the costs of transportation and regeneration in known devices are more than counter-balanced.

In the embodiment of the invention, the cartridge has a chamfer or bevel to receive a circumferential joint or seal in the area of the edge of the cartridge which borders a tank cover provided for the cartridge exchange, whereby a clamp ring is screwed onto the edge of the cartridge to press the circumferential joint or seal on the cartridge and the tank. The joint is pressed with this clamp ring into the annular space between cartridge and tank which is configured in a wedge shape by the chamfer, whereby it produces both a seal to prevent flow leakage between cartridge and tank and a force-locking positioning of the cartridge. A chamfer or bevel on the outside bottom edge of the clamp ring also favors pressing the circumferential joint. It is advantageous that the cartridge have an outside threading for the clamp ring.

Also, the tank should consist of thin, corrosion-resistant, high strength superrefined steel plate. A pressure-resistant tank can be easily produced from a sheet steel of this type, on the inside of which the cartridge can be fitted under the effect of the water pressure. Since the cartridge need not absorb the operation pressure, it can be relatively thin-walled and of inexpensive material. Polyethylene or another plastic with similar properties can be recommended. Thus the various material properties of the materials for the tank and the cartridge can be best utilized.

According to another feature of the invention, a circumferential groove with a sealing ring is provided near the tank base, whereby the groove, as disclosed in the invention, is molded in the outside of the cartridge. This sealing ring forms an additional assurance against leakage current. If the water inlet connection is found at the base of the tank, this sealing ring therefore prevents that the cartridge be pressed together by the pressure of the impinging leakage current.

The device according to the invention can furthermore be provided with a conductometer on the tank cover in the area of the water discharge connection, to show whether the exchanger resins are still operable.

The invention also discloses that the cartridges are provided with perforated covers on the front. These covers are parts of the cartridge, and thus the manufacture of the tank is essentially simplified. Also, a distributor plate of liquid-permeable and flexible material can be arranged between the surface of the mixed bed and the perforated cover, to assure a uniform distribution of the water over the entire top surface of the cartridge.

The invention is described relative to one embodiment shown in the drawing, wherein the device is shown in partial longitudinal cross section.

The device has a tank 1, of high strength superrefined steel plate, with an essentially cylindrical part 1a, which is formed of a flat steel plate and of which the longitudinal edges are connected by a weld seam (not shown). An arcuate base 1b is welded onto the bottom edge of cylindrical part 1a by means of a weld seam 2, which base has a screw coupling 3 in the bottom part for a pipe connection 4, which can be fitted in a simple manner to a water line. The top border of cylindrical part 1a is molded into a flange 5. Parts 1a and 1b can also be formed out of a deep drawn sheet steel.

The wall thickness of tank 1 is approximately 0.8 mm and serves to receive an essentially cylindrical cartridge 6, of which the bottom part 6a is fitted to the form of the base 1b and is closed off by a perforated base 6b. A circumferential, approximately semicircular groove 7 is formed in bottom part 6a, and serves to receive a sealing ring 8, which engages against the wall of base 1b of tank 1.

The top opening of cartridge 6 has a reinforced neck 6c, which is connected through a chamfer 6d with the cylindrical part of cartridge 6. Neck 6c has threads 6e on the outside and an inside flange 6f. The opening of cartridge 6 is closed by a perforated cover 9 which preferably can be welded with neck 6c of cartridge 6.

An annular, perforated clamp ring 10 is screwed on the threading 6e of neck 6c, and its bottom border has a chamfer 10a, whereby the larger diameter of clamp ring 10 is insignificantly smaller than the inside diameter of tank 1. A circumferential joint 11 is inserted in the space between the two chamfers or bevels 6d and 10a. Clamp ring 10 has an inside threading 12, whereby it can be screwed on neck 6c, whereby the joint or seal 11 is pressed to the inside wall of tank 1.

Tank 1 is covered on the top by a bonnet-like tank cover 13, which has a flange 14 at the bottom. A T-shaped sealing ring 15 is inserted between the flanges 5 and 14. A locking ring 16, surrounding flanges 5 and 14, serves for easily detachable connection of flanges 5 and 14 and sealing ring 15 inserted between them. It has sides converging from the inside of the container and is clamped tightly in a known manner by a toggle switch closure. A conductometer 17 is affixed on cover 13 by screwing, which has a cable 18 for connection with an electrical power supply and a water discharge pipe 19 for discharge of the desalted water.

Cartridge 6 is of polyethylene manufactured for example by the vacuum forming method, whereby the walls 6, 6a, and 6d are approximately 1.4 to 1.6 mm thick. This holds down the manufacture cost of cartridge 6. This wall thickness is of course not sufficiently pressure-resistant to be able to absorb the customary waterline pressure of about 8 atm. But since it can be engaged against the pressure resistant tank 1, no strength problems are manifested. Both sealing rings 8 and 11 are provided for sure fixation of cartridge 6 in tank 1 and for prevention of leakage current between tank 1 and cartridge 6.

Cartridge 6 is nearly filled with the exchanger resins, whereby a bottom plate 20 of flexible and liquid-permeable material is laid on the bottom 6b. Another plate 21 of flexible and liquid-permeable material covers the flat surface of the exchanger resins, and then it is closed by cover 9. In this manner, no hollow space is created in the exchanger resins in the cartridge and the liquid flowing through is distributed uniformly over the entire surface of the cartridge and thereby optimum utilization of the exchanger resins is attained.

The cartridge 6 filled with ion exchanger mixed bed is inserted in tank 1 with slight vertical pressure, and then clamp ring 10 is screwed on. An axial pressure is thereby exerted on circumferential joint 11, whereupon the bottom sealing ring 8 is pressed on the conical wall of bottom 1b and circumferential joint 11 is pressed tightly on cover 1a. Chamfers 6d and 10a serve as support for joint 11.

If tank 1 is operated with water under pressure, then sealing ring 8 prevents impingement of leakage current, whereby the top joint 11 prevents axial movement of cartridge 6. The pressure of the conduction line water affects the bottom part of cartridge 6 in full strength, but is partially weakened with further impingement through the mixed bed. The walls of cartridge 6 which are not pressure resistant can expand in the intermediate space between walls 1a and 6 and be supported on support on the wall of the pressure resistant tank 1. The intermediate chamber between walls 1a and 6 has the further advantage that finish imperfections in the production of tank 1 can be compensated for.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What is claimed is:

1. An apparatus for the desalination of water comprising:
   a cylindrical pressure-resistant vessel having means at the ends thereof for connection to a pressurized water line;
   a disposable cylindrical cartridge having peripheral walls formed of water impermeable, non-pressure resistant material positioned within said vessel so that the peripheral walls of said cartridge are in close proximity to or abutting the inside of said vessel,
   a mixed bed of cationic and anionic exchange resins in said cartridge,
   removable cover means at one end of said vessel,
   water inlet and outlet means at the axial ends of said cartridge so that said cartridge is positioned in said vessel in such a way that water passing through said vessel will pass through said cartridge,
   first sealing means near the end of said cartridge adjacent said water inlet means for establishing a water-pressure-tight seal between the wall of said cartridge and said vessel,
   said cartridge including a clamping ring threadedly attached to the upper portion of said cartridge and an inwardly directed chamfer adjacent said clamp ring,
   said first sealing means including a circumferential gasket abutting said chamfer and urged into contact with said vessel by means of said clamp ring whereby the pressure of water passing through said cartridge is transferred through the non-pressure resistant walls of said cartridge to the pressure resistant walls of said vessel without damage to the walls of said cartridge.

2. A device as in claim 1, wherein said clamp ring further includes a chamfer or bevel on its bottom outside border abutting said gasket.

3. A device as in claim 2, wherein said cartridge has outside threads for receiving said clamp ring.

4. A device as in claim 3, wherein said tank is of thin, corrosion-resistant, high strength superrefined steel plate.

5. A device as in claim 4, wherein said cartridge consists of thin, non-pressure-resistant polyethylene.

6. A device as in claim 2, including second sealing means, said second sealing means includes a circular groove formed in the wall of said cartridge and a sealing ring positioned in said groove.

7. A device as in claim 6, wherein said groove is molded in the outside of said cartridge.

8. A device as in claim 6, wherein the connection for the water input is found on the base of said tank.

9. A device as in claim 8, and including a conductometer on the cover of said tank in the area of the water discharge connection.

10. A device as in claim 9, wherein said cartridge is provided with perforated covers on the axial ends thereof.

11. A device as in claim 10, wherein a distributor plate of liquid-permeable and flexible material is found between the top surface of the mixed bed and said perforated cover.

* * * * *